United States Patent
Kvarnström (10) Patent No.: US 10,323,742 B2
(45) Date of Patent: Jun. 18, 2019

(54) GEAR SHIFTER INCLUDING A POSITION SENSOR ASSEMBLY

(71) Applicant: Kongsberg Automotive AB, Mullsjö (SE)

(72) Inventor: Anders Kvarnström, Jönköping (SE)

(73) Assignee: Kongsberg Automotive AB, Mullsjö (SE)

( * ) Notice: Subject to any disclaimer, the term of this patent is extended or adjusted under 35 U.S.C. 154(b) by 313 days.

(21) Appl. No.: 15/300,483

(22) PCT Filed: Mar. 18, 2014

(86) PCT No.: PCT/EP2014/055451
§ 371 (c)(1),
(2) Date: Sep. 29, 2016

(87) PCT Pub. No.: WO2015/139740
PCT Pub. Date: Sep. 24, 2015

(65) Prior Publication Data
US 2017/0122429 A1    May 4, 2017

(51) Int. Cl.
*F16H 59/10*    (2006.01)
*F16H 59/02*    (2006.01)
*F16H 59/04*    (2006.01)

(52) U.S. Cl.
CPC ....... *F16H 59/105* (2013.01); *F16H 59/0204* (2013.01); *F16H 59/044* (2013.01); *F16H 2059/0269* (2013.01)

(58) Field of Classification Search
CPC .... F16H 59/105; F16H 59/204; F16H 59/044; F16H 2059/0269
(Continued)

(56) References Cited

U.S. PATENT DOCUMENTS 3,913,115 A * 10/1975 Mueller .................. G03B 17/42
                                                        396/284
5,307,918 A *  5/1994 Rivera .................... B66B 29/02
                                                        198/323
(Continued)

FOREIGN PATENT DOCUMENTS

DE    19608981 A1 *  9/1997 ......... F16H 59/0204
DE    10319720 B3 *  9/2004 ......... F16H 59/0204
(Continued)

OTHER PUBLICATIONS

International Search Report for International Application No. PCT/EP2014/055451 dated Nov. 4, 2014, 3 pages.
(Continued)

*Primary Examiner* — William Kelleher
*Assistant Examiner* — Gregory Robert Weber
(74) *Attorney, Agent, or Firm* — Howard & Howard Attorneys PLLC (57) ABSTRACT

The present invention is directed to a gear shifter for a transmission of a vehicle comprising a shift lever (2) which is mounted in a housing to be pivotable about a first axis, a position sensor assembly (4) disposed stationary in the housing and comprising a plurality of position sensors (6) distributed along a path, a sensor triggering element (8) mounted on an element carrier which is moveably mounted in the housing and coupled to the shift lever by a linkage (18) in such a manner to be able to move the sensor triggering element (8) along said path of position sensors (6) in response to pivotal shift movements of the shift lever about the first axis, characterized in that the element carrier (10) is pivotally mounted with respect to the position sensor assembly (4) at a pivot point (12) spaced apart from the sensor triggering element carried by it and spaced apart from the path of position sensors such that a pivotal movement of the element carrier (10) moves the sensor triggering element (8)

(Continued)

along the path of position sensors, and in that the coupling of the linkage (18) to the element carrier is located on the element carrier between its pivotal mounting (12) and the sensor triggering element.

8 Claims, 9 Drawing Sheets

(58) Field of Classification Search
USPC ............................................ 74/473.12
See application file for complete search history.

(56) References Cited

U.S. PATENT DOCUMENTS

| | | | | |
|---|---|---|---|---|
| 6,530,293 | B1* | 3/2003 | Ruckert | F16H 59/105 |
| | | | | 324/207.23 |
| 7,086,306 | B2* | 8/2006 | Syamoto | F16H 59/0204 |
| | | | | 74/471 XY |
| 7,614,319 | B2 | 11/2009 | Hermansson et al. | |
| 8,333,128 | B2* | 12/2012 | Schober | F16H 59/105 |
| | | | | 74/473.12 |
| 2005/0028631 | A1* | 2/2005 | Watkins | F16H 59/042 |
| | | | | 74/473.1 |
| 2008/0041182 | A1 | 2/2008 | Giefer et al. | |
| 2010/0242654 | A1* | 9/2010 | Corney | G05G 1/04 |
| | | | | 74/471 XY |
| 2011/0202242 | A1* | 8/2011 | Habenschaden | F16H 59/0204 |
| | | | | 701/51 |
| 2016/0377174 | A1* | 12/2016 | Voelz | F16H 59/105 |
| | | | | 74/491 |
| 2018/0180170 | A1 | 6/2018 | Kvarnstrom | |

FOREIGN PATENT DOCUMENTS

| | | | | |
|---|---|---|---|---|
| DE | 102006021078 B3 * | 8/2007 | ........... | F16H 59/105 |
| DE | 102006044404 B4 * | 3/2009 | ........... | F16H 59/044 |
| EP | 1992845 A2 | 11/2008 | | |
| JP | S 61-36751 U | 3/1986 | | |
| JP | 2008-239057 A | 10/2008 | | |
| WO | WO-2015032454 A1 * | 3/2015 | ......... | F16H 59/0204 |

OTHER PUBLICATIONS

English language abstract for EP1992845A2 extracted from espacenet. com database on Mar. 14, 2018, 2 pages.

International Search Report for Application No. PCT/EP2015/070175 dated May 10, 2016, 3 pages.

* cited by examiner

GEAR SHIFTER INCLUDING A POSITION SENSOR ASSEMBLY

The subject application is the National Stage of International Patent Application No. PCT/EP2014/055451, filed on Mar. 18, 2014, the disclosure of which is incorporated herein by reference in its entirety.

The present invention is directed to a gear shifter for a transmission of a vehicle comprising a shift lever which is mounted in a housing to be pivotable about a first axis, a position sensor assembly disposed stationary in the housing and comprising a plurality of position sensors distributed along a path, a sensor triggering element mounted on an element carrier which is moveably mounted in the housing and coupled to the shift lever by a linkage in such a manner to be able to move the sensor triggering element along said path of position sensors in response to pivotal shift movements of the shift lever about the first axis.

Such gear shifters are for example utilized in shift-by-wire gear shifter assemblies or in Tip-Tronic shifters (including mechanical PRND and an electrical manual shifting mode) in which the positioning of the shift lever is detected by a position sensor assembly, and a corresponding control signal is transmitted to the transmission for actuating it in the desired manner. There is a sensor triggering element (e.g. a magnet) which is moved in response to shift movements along a path of position sensors, wherein a particular position sensor is activated when the sensor triggering element is positioned in close proximity to the particular position sensor.

A gear shifter according to the preamble of claim 1 is disclosed in U.S. Pat. No. 7,614,319 B2. A shift lever is mounted in a housing to be pivotable about a first axis. The shift lever disclosed is indeed also pivotable about a second axis perpendicular to the first axis. A position sensor assembly is disposed stationary in the housing and comprises a plurality of position sensors distributed along a path. A sensor triggering element is mounted on an element carrier which is connected to the shift lever such that it follows the pivotable shift movements of the shift lever about the first axis. This movement of the element carrier is accompanied by moving the sensor triggering element along the path of position sensors. The position sensor that is in close proximity to the sensor triggering element signals the presence of the sensor triggering element and thus gives an indication of the positioning of the shift lever. In the gear shifter disclosed there is a second path of position sensors displaced vertically above the first part of sensors. By pivoting the shift lever about the second axis the remote end of the element carrier is vertically moved, and in this manner the sensor triggering element may be moved between the first and second paths of sensor elements.

The element carrier is connected to the shift lever at a position spaced apart from the pivotal mounting of the shift lever. The element carrier presses the sensor triggering element against a console wall on which the paths of position sensors is mounted. During shift movements of the shift lever the sensor triggering element slides along the console wall with its position sensor path. The distances the sensor triggering element travels during pivotal shift movements of the shift lever depends only on the vertical distance of the sensor triggering element from the pivotal bearing of the shift lever in the housing.

For such gear shifters there are two conflicting design goals. On the one hand it is desired to realize a compact gear shifter design. This requires that the length of the shift lever extending vertically below the pivotal bearing is limited. This implies rather short travelling distances of the lower end of the shift lever to which the linkage to the element carrier is coupled when the shift lever is moved between the shift positions, and this in turn implies rather short distances between the sensor triggering element positions corresponding to the shift positions. On the other hand it is desired that the position sensor assembly gives a good spatial resolution in indicating the shift lever position, or in other words gives a reliable indication of the actual shift lever position. For this aspect it would be desirable to have the position sensors for subsequent shift positions to be spaced apart by a certain minimum distance so that the position sensor assembly can in a reliable manner discriminate between different positions of the sensor triggering element and thus of the shift lever.

It is an object of the present invention to provide a gear shifter which allows to be realized in a compact design and which allows to accurately and efficiently discriminate between the various positions of the shift lever.

This object is achieved by gear shifter comprising the features of claim 1. Preferred embodiments of the invention are set out in the depended claims.

According to the present invention the element carrier is pivotally mounted in the housing with respect to the position sensor assembly at a pivot point which is spaced apart from the path of position sensors and the sensor triggering element such that a pivotal movement of the element carrier moves the sensor triggering element along the path of position sensors. The linkage is coupled to the element carrier at a location on the element carrier between its pivotal mounting and the sensor triggering element. Due to this arrangement the sensor triggering element is further away from the pivot point of the element carrier than the coupling of the linkage. Therefore, movements of the linkage in response to pivotal shift movements of the shift lever are transmitted into sensor triggering element movements over a longer distance because the sensor triggering element is disposed further away from the pivot axis of the element carrier than the coupling of the linkage to the element carrier. In other words the pivotal shift movements of the shift lever are transmitted into sensor triggering element movements with a transmission ratio>1. Since the sensor triggering element travels over a longer distance between shift positions of the shift lever the position sensors can be disposed along the path with greater distances in between. When the sensor triggering element is in proximity to one of the position sensors so that the position sensor senses its presence, the next position sensors along the path are sufficiently spaced apart so that an accidental triggering of one of the adjacent position sensors is excluded.

In a preferred embodiment the pivot axis of the pivotal mounting of the element carrier is parallel to the first axis, i.e. the element carrier pivots in a plane parallel to the plane in which the shift lever pivots during shift movements of the shift lever.

According to a preferred embodiment the linkage transmitting shift lever movements to the element carrier comprises a link lever which is coupled at one of its ends to a lower end portion of the shift lever below the pivotal bearing of the shift lever in the housing, and which is rotably coupled at its other end to the element carrier.

According to a preferred embodiment the shift lever is mounted in the housing to be pivotable about a second axis perpendicular to the first axis. This second axis allows to select a particular shift gate.

In case there are more than one shift gate and the shift lever is pivotable about the second axis, it is preferred that the link lever is rotatably coupled to the shift lever to be pivotable about an axis parallel to the second axis. In this case the link lever is coupled to the element carrier by a ball joint so that it can accommodate shift movements of the shift lever as well as select movements of the shift lever between different shift gates, whereas the element carrier is limited in its movements to a plane. The pivotal mounting of the element carrier comprises a pivot pin stationary with respect to the housing, and the element carrier is provided with an elongated slot for receiving the pivot pin such that the element carrier may be displaced with respect to the pivot pin which may slide along the elongated slot, when the shift lever is pivoted about the second axis.

In the aforementioned case of a second shift gate the position sensor assembly comprises a second path of position sensors disposed parallel to but displaced with respect to the first path such that the sensor triggering element on the element carrier may be brought from a positioning in alignment with the first path to a positioning in alignment with the second path of position sensors by pivoting the shift lever about the second axis in a first direction, and vice versa by pivoting the shift lever back in the opposite direction.

In a preferred embodiment the sensor triggering element comprises a magnet, and the position sensors comprise Hall sensors.

The invention will in the following be described for preferred embodiments with reference to the drawings in which.

The embodiment of the gear shifter according to the present invention shown in FIGS. 1 to 9 comprises a shift lever 2 mounted in a housing (not shown), wherein the pivotal bearings of the shift lever 2 in the housing have been omitted to simplify the drawings. The shift lever 2 may be pivoted about a first axis, which first axis is perpendicular to the Figure plane of FIGS. 6 to 9 so that during pivotal shift movements the shift lever 2 moves within the Figure plane of FIGS. 6 to 9. The shift lever 2 is further pivotable about a second axis, which second axis is perpendicular to the Figure plane of FIGS. 2 to 5, to move the shift lever from a first to a second shift gate and vice versa. The pivotal bearings of the shift lever 2 in the housing are proximately in the middle of the shift lever 2 shown in the Figures.

A linkage 18 in the form of a U-shaped bracket is coupled to a lower end portion of the shift lever 2. In particular the outer ends of the linkage legs 19 of the U-shaped bracket are each coupled to the shift lever 2 by a respective pin which is received in a coupling recess in the shift lever 2 such that the linkage 18 may pivot about the pins coupling the outer ends of its linkage legs 19 to the shift lever.

The linkage apex 20 in the middle between the two outer ends of the linkage legs 19 is coupled to an element carrier 10 by a ball joint (not shown). The element carrier 10 is disposed in front of a wall 28 of an inner housing structure 22 and is moveable with respect to the wall surface.

A pivot pin 12 is connected to the wall of the inner housing structure and is received within an elongated slot 11 (see FIGS. 6 to 9) of element carrier 10. In this manner the element carrier 10 may pivot about pivot pin 12, and be moved up and down, wherein the positioning of the element carrier 10 is determined by the positioning of the linkage apex 20 of the linkage 18 which is coupled to the element carrier 10 by a ball joint (not shown).

Figure 1:
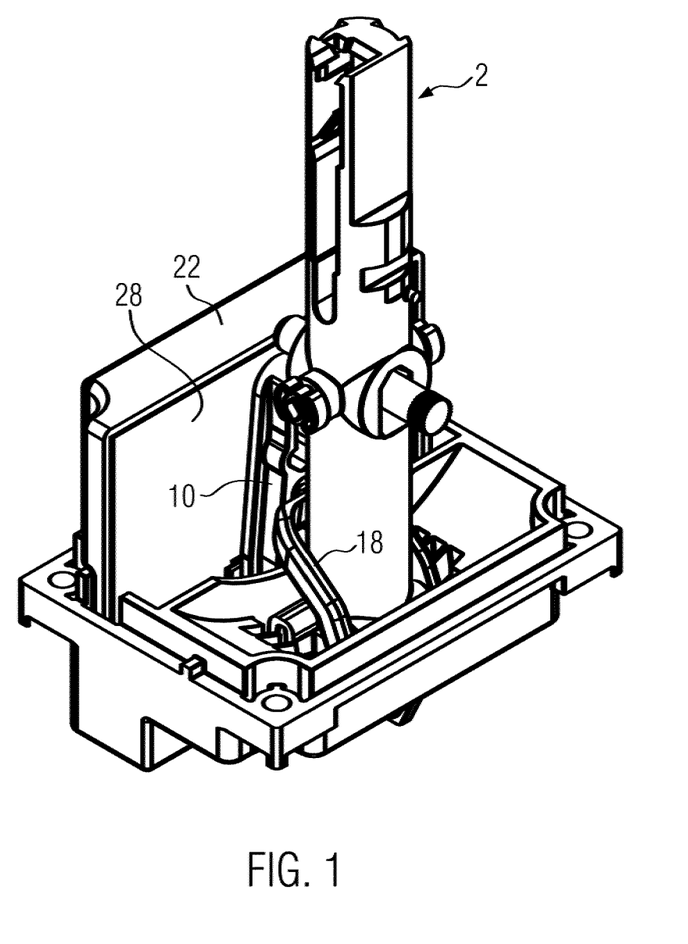
FIG. 1 shows a perspective view of a gear shifter of the present invention.
Figure 2:
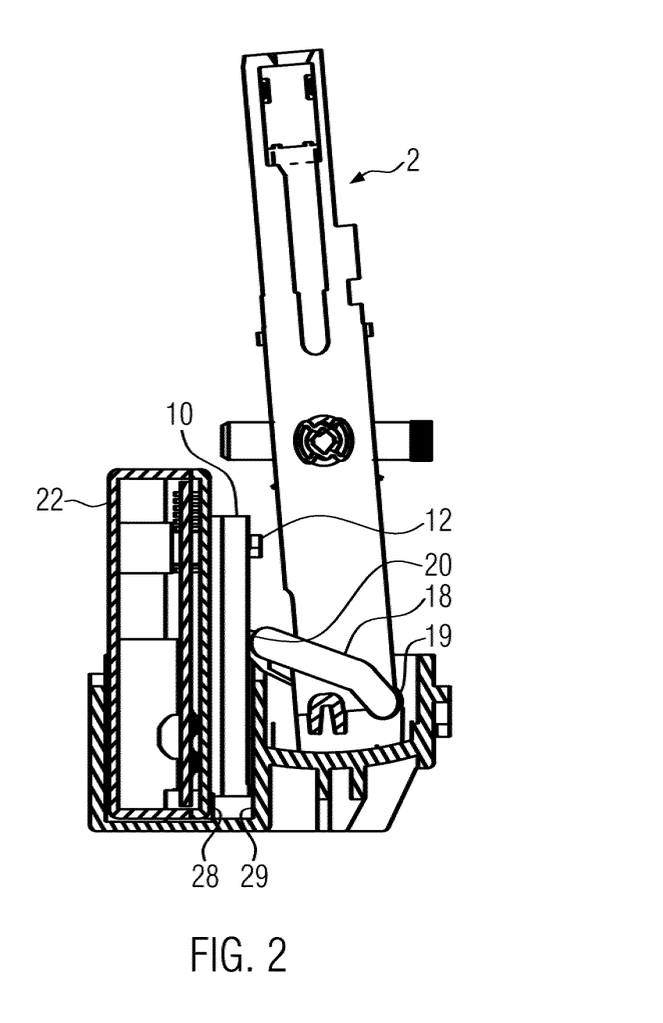
FIGS. 2 to 5 show front views of the gear shifter of FIG. 1 in different positions of the gear shifter.
Figure 3:
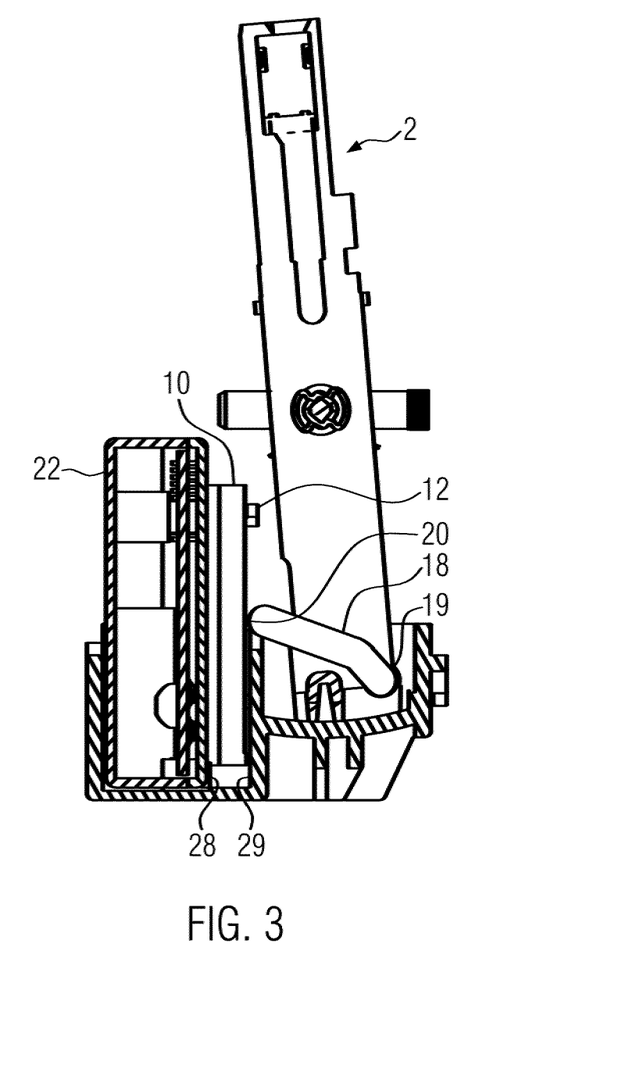
Figure 4:
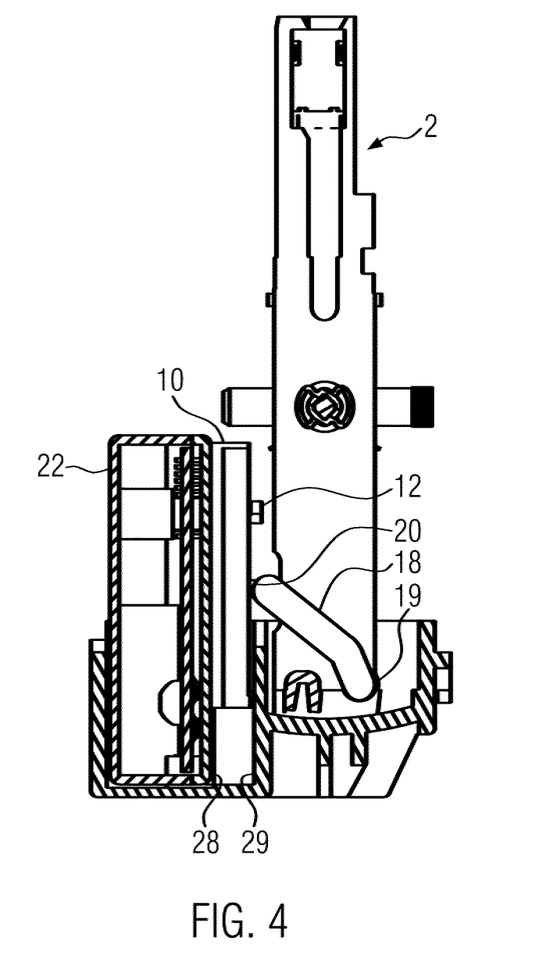

As can be seen in the views of FIGS. 2 to 4, element carrier 10 is received and guided with its lower portion in a recess formed by the wall 28 of the inner housing structure 22 and a further wall 29 of the housing structure. In this recess the element carrier 10 can move vertically up and down (see FIGS. 2 and 3), and may pivot about the pivot pin 12.

The element carrier 10 carries in a lower end portion thereof a sensor triggering element 8, for example a magnet. On the inner wall of the inner housing structure 22 against which the element carrier 10 is moved a position sensor assembly 4 (see FIGS. 6 to 9) is disposed. This position sensor assembly 4 comprises three position sensors 6 distributed along a first path. In the illustrated embodiment there is a second path of position sensors disposed above the first path of position sensors 6. Each position sensor may for example include a hall sensor which is triggered by the sensor triggering element 8 when it comes into close proximity of one of the position sensors. In the position illustrated in FIG. 6 the first position sensor 6 on the right hand side would be triggered by the sensor triggering element 8, whereas all the remaining position sensors would be left inactivated.

Figure 6:
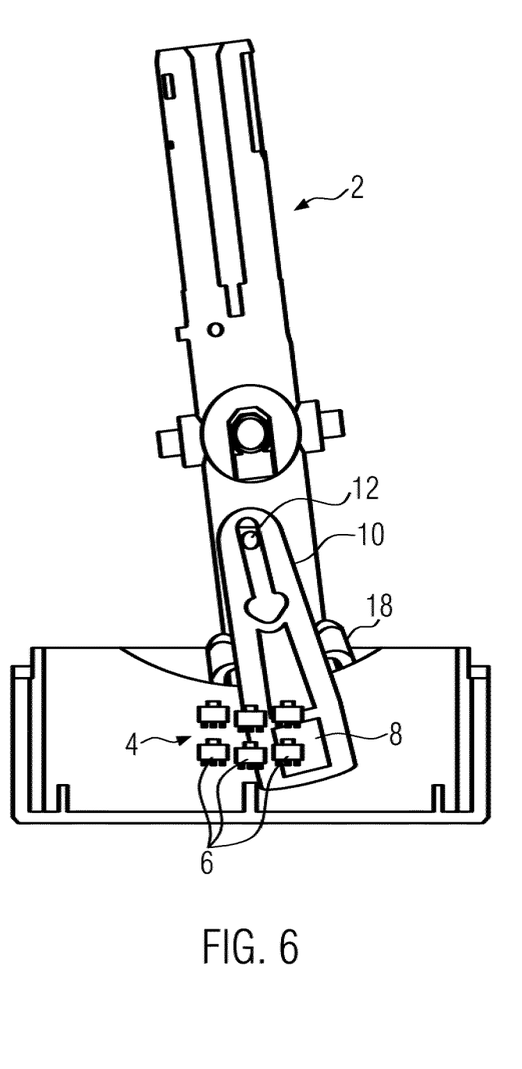
FIGS. 6 to 9 show side views of the gear shifter of the previous Figures in different positions of the gear shifter.
Figure 7:
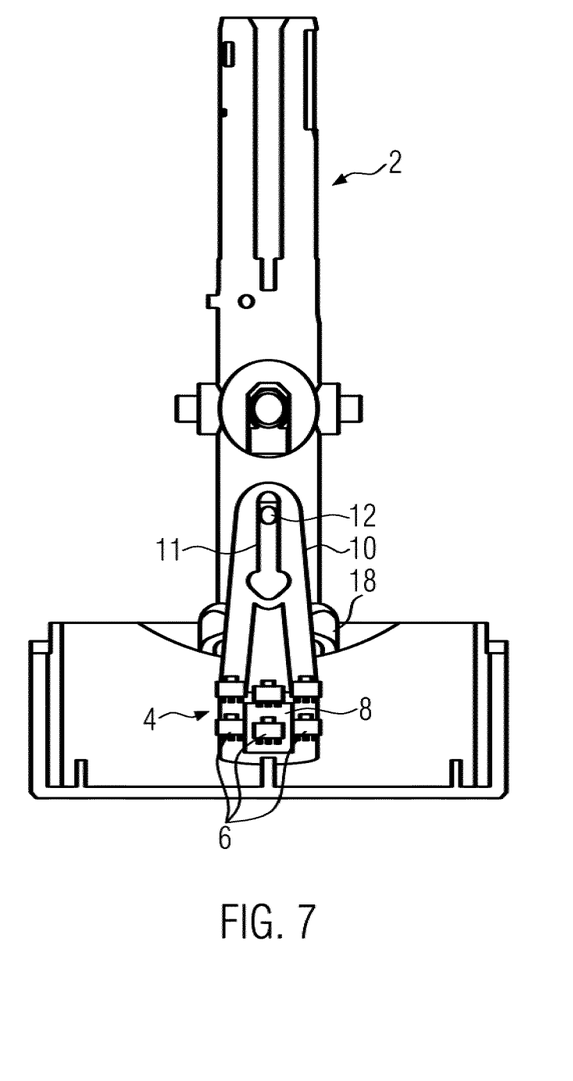

A shift movement of the shift lever 2 is illustrated in FIGS. 6 and 7, wherein the shift movement of the shift lever 2 is transmitted by linkage 18 to the element carrier 10 such that it pivots about pivot pin 12. This pivotal movement of the element carrier 10 results in a corresponding pivotal movement of the sensor triggering element 8 carried at the lower end of the element carrier 10. In FIG. 7 the sensor triggering element 8 reached the central position sensor 6 in the path of position sensors 6. In FIGS. 2 and 3 the shift movement of FIGS. 6 and 7 is shown in a front view. In this view the lower end portion of the shift lever 2 is moved approximately perpendicular to the Figure plane during a shift movement. This pivotal movement of the shift lever 2 is accompanied by a slight pivotal movement of linkage 18 such that the linkage apex 20 is slightly pivoted downwards.

Figure 8:
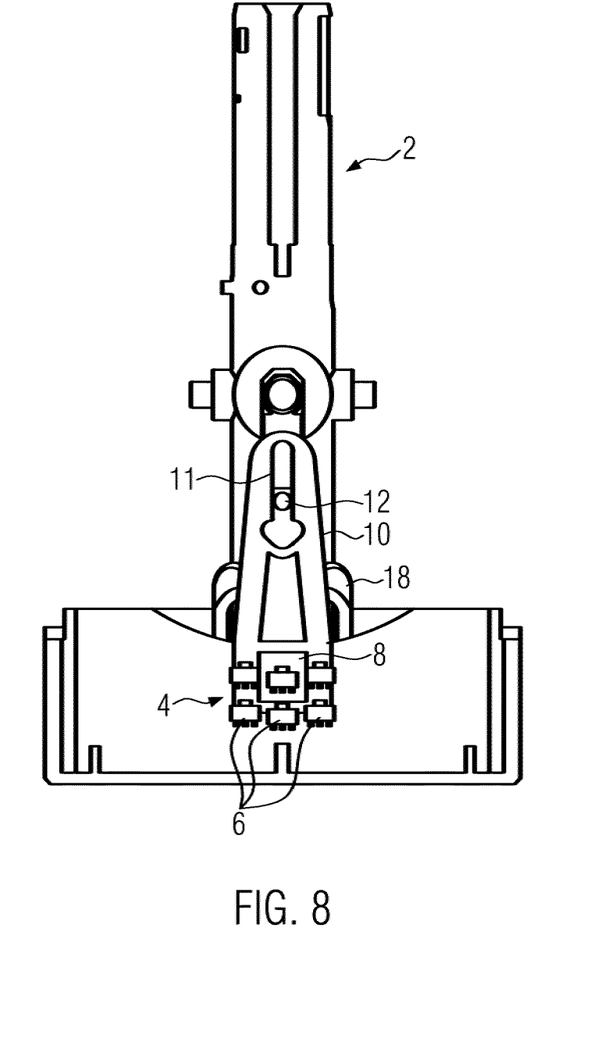

FIGS. 3 and 4 illustrate a shift movement of the shift lever 2 about the second axis, wherein this pivot movement of the shift lever 2 is in the Figure plane of FIGS. 3 and 4. This movement of the shift lever 2 corresponds to the movement between two shift gates. As can be seen from FIGS. 3 and 4 the lower end portion of the shift lever 2 is moved closer to the element carrier 10. During this movement the linkage apex 20 of linkage 18 is pivoted upwards. This pivoting of the linkage apex 20 upwards moves element carrier 10 in sliding contact against the wall 28 of the inner housing 22 vertically upwards. A corresponding movement can be seen in side view in FIGS. 7 and 8. As can be seen from FIGS. 7 and 8 the pivotal movement of the shift lever from FIG. 3 to FIG. 4 has the effect that the element carrier 10 is vertically lifted such that the sensor triggering element 8 carried at its lower end is moved from the central position sensor of the first path of position sensors (FIG. 7) to the central position sensor of the second path of position sensors disposed above the first path of position sensors 6 (FIG. 8). During this vertical lifting movement the element carrier 10 slides upwards with respect to the stationary pivot pin 12 which is accompanied by a relative movement of the pivot pin 12 within the elongated slot 11 of the element carrier 10.

Figure 5:
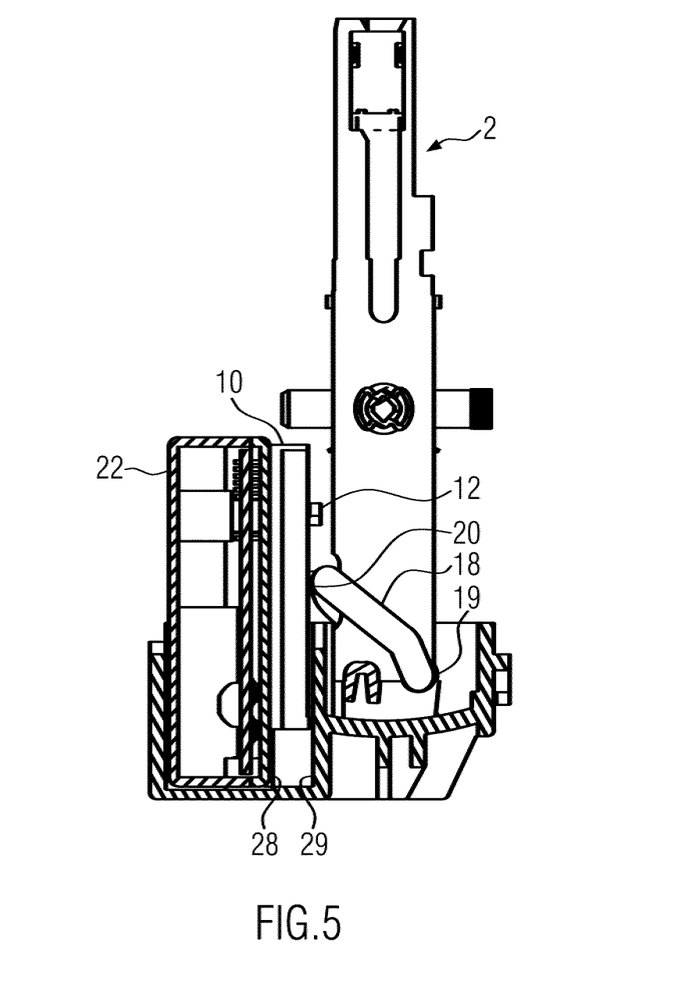
Figure 9:
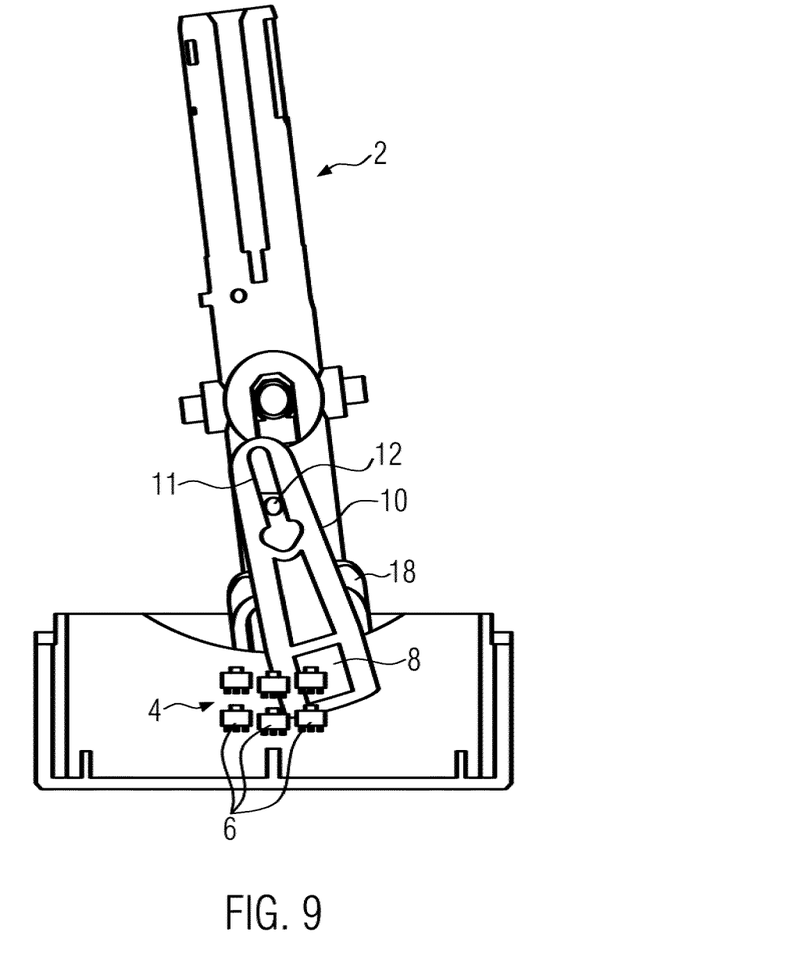

FIGS. 8 and 9 illustrate a further shift movement of the shift lever 2 from a vertical upright positioning of the shift lever (FIG. 8) to a pivoted position of the shift lever 2 (FIG. 8). Again, this shift movement of the shift lever is transmitted by the linkage 18 to the element carrier 10 such that it performs a pivotal movement about pivot pin 12 which moves the sensor triggering element 8 at its lower end from the central position sensor to the position sensor on the right hand side of the second path of opposition sensors. The front views corresponding to FIGS. 8 and 9 are shown in FIGS. 4 and 5.

Due to the coupling of the linkage 18 at the element carrier 10 at a position between the pivot pin 12 and the sensor triggering element 8 at its lower end the pivotal movement of the shift lever 2 transmitted by linkage 18 to the element carrier 10 is translated into an enlarged pivotal movement of element carrier 10 compared to shift lever 2. This transmission of pivotal movement with a transmission ratio larger than 1 can for example be seen from a comparison of FIGS. 8 and 9 which shows that element carrier 10 pivots over a larger angular range in this transition compared to the angular movement of the shift lever 2. In this manner a transmission of the shift lever movement into a sensor triggering element movement with a transmission ratio larger than 1 is achieved. Therefore the position sensors 6 may be placed at a greater distance to each other along the path of position sensors as compared to a transmission to the sensor triggering element with transmission ratio of 1 or smaller. The positioning of the position sensors 6 at a greater distance along the path of position sensors 6 permits a more reliable performance of the position sensor assembly since the risk that an adjacent position sensor is erroneously activated because it is too close to an adjacent position sensor which was not intended to be activated, is reduced.

The invention claimed is:

1. A gear shifter for a transmission of a vehicle, the gear shifter comprising:
   a housing,
   a shift lever mounted in the housing and pivotable about a first axis,
   a position sensor assembly disposed stationary in the housing and comprising a plurality of position sensors distributed along a path,
   an element carrier moveably mounted in the housing with said element carrier having first and second ends and defining a plane, and
   a sensor triggering element mounted on the second end of the element carrier and coupled to the shift lever by a linkage to enable movement of the sensor triggering element along the path of position sensors in response to pivotal shift movements of the shift lever about the first axis,
   wherein the element carrier is pivotable about a pivot point adjacent the first end of the element carrier spaced from the sensor triggering element carried by the element carrier and spaced from the path of the position sensors such that a pivotal movement of the element carrier moves the sensor triggering element along the path of the position sensors, and
   wherein the linkage is coupled to the element carrier at a location on the element carrier between the pivot point and the sensor triggering element and the location of the linkage on the element carrier remains fixed relative to the plane and the first and second ends of the element carrier during the pivotal movement of the element carrier about the pivot point.

2. The gear shifter according to claim 1, wherein a pivot axis of the pivot point of the element carrier is parallel to the first axis.

3. The gear shifter according to claim 1, wherein the linkage comprises a link lever coupled at one end to a lower end portion of the shift lever below a pivotal bearing of the shift lever in the housing and the link lever being rotatably coupled at the other end to the element carrier.

4. The gear shifter according to claim 1, wherein the shift lever is mounted in the housing to be pivotable about a second axis perpendicular to the first axis.

5. The gear shifter according to claim 3, wherein the link lever is rotatably coupled to the shift lever to be pivotable about an axis parallel to a second axis and the link lever is coupled to the element carrier by a ball joint, and wherein the element carrier is coupled to the shift lever by a pivotal mounting comprising a pivot pin stationary with respect to the housing and the element carrier is provided with an elongated slot for receiving the pivot pin such that the element carrier is displaceable with respect to the pivot pin when the shift lever is pivoted about the second axis.

6. The gear shifter according to claim 5, wherein the position sensor assembly comprises a second path of position sensors disposed parallel to but displaced with respect to the first path such that the sensor triggering element on the element carrier is brought from a positioning in alignment with the first path to a positioning in alignment with the second path of position sensors by pivoting the shift lever about the second axis in a first direction and by pivoting the shift lever back in an opposite direction.

7. The gear shifter according to claim 1, wherein the sensor triggering element comprises a magnet and that the position sensors comprise Hall sensors.

8. The gear shifter according to claim 4, wherein the link lever is rotatably coupled to the shift lever to be pivotable about an axis parallel to a second axis and the link lever is coupled to the element carrier by a ball joint, and wherein the element carrier is coupled to the shift lever by a pivotal mounting comprising a pivot pin stationary with respect to the housing and the element carrier is provided with an elongated slot for receiving the pivot pin such that the element carrier is displaceable with respect to the pivot pin when the shift lever is pivoted about the second axis.

* * * * *